United States Patent

[11] 3,611,373

| [72] | Inventor | Victor F. Cartwright<br>Fullerton, Calif. |
|---|---|---|
| [21] | Appl. No. | 835,701 |
| [22] | Filed | June 23, 1969 |
| [45] | Patented | Oct. 5, 1971 |
| [73] | Assignee | Babcock Electronics Corporation<br>Casta Mesa, Calif. |

[54] MISS DISTANCE RANGE DETECTION SYSTEM
11 Claims, 5 Drawing Figs.

[52] U.S. Cl. .................................................. 343/7.7,
343/9, 343/12 MD, 343/13
[51] Int. Cl. ...................................................... G01s 9/42
[50] Field of Search .......................................... 343/7.7, 9,
12 MD, 13

[56] References Cited
UNITED STATES PATENTS

| 2,741,762 | 4/1956 | Page ............................ | 343/13 |
| 3,112,480 | 11/1963 | Lakatos ....................... | 343/9 |
| 3,166,746 | 1/1965 | Jacobson ..................... | 343/9 |
| 3,480,959 | 11/1969 | Richmond .................... | 343/13 X |

*Primary Examiner*—T. H. Tubbesing
*Attorney*—Nienow & Frater

ABSTRACT: Ranging systems of the radar type incorporating range gates which will pass signals derived from returning echoes upon simultaneous application to the gate of a locally injected signal which is applied to each gate at a different time corresponding to a selected increment of the range of the system. The use of timed attenuation of returning echoes limits the amplitude of early returning echoes and nearby noise.

INVENTOR
VICTOR F. CARTWRIGHT
BY
ATTORNEYS

INVENTOR
VICTOR F. CARTWRIGHT
BY
ATTORNEYS 3,611,373

MISS DISTANCE RANGE DETECTION SYSTEM

This invention relates to improvements in ranging systems.

An object of the invention is to provide an improved range-finding system. While not limited thereto, the invention is particularly useful in connection with systems for determining the range to moving targets through the detection of doppler signals and the provision of an improved system of that kind is another object. Another object is to provide an improved radar system for finding the range to a moving target from a station at which both the transmitter and the receiver are located.

One application of range-measuring radar systems is to determine the distance at which bullets and missiles pass targets at which they are fired. The radar system might be carried upon a drone or other moving target where it forms part of a larger system, including apparatus for telemetering to a ground station range the determinations made by the "bullet-scorer" radar or "miss-distance" radar as these radar systems are often called. In that application it may be required to determine whether bullets come within 5 feet or even less of the target and the provision of a system which will provide range information reliably with this order of accuracy is another object of the invention.

Such a radar system may be required to indicate whether a bullet has passed the target within a range of 200 feet at a distance measured accurately to within several feet. Not only is the radar target often very small, being only the size of a bullet, but the range of amplitude of returning signals varies widely in that circumstance because signal dispersion varies as the square of the distance over which it travels. In this connection another object of the invention is to provide a radar system which can cope with a very wide range in echo and noise signal levels, which can be produced at minimum cost in an apparatus having minimum size and weight.

The invention provides a range detection system which includes a means for transmitting signals for a period of time required for those signals to traverse a selected fraction of the range of the system. It includes detecting means for detecting those signals as echoes after reflection from a distant target. It employs multiple detecting elements of a kind operative to provide output signals upon the simultaneous application thereto of two input signals. The system also includes means for applying, simultaneously to said detecting elements, signals which are derived from the echoes of the transmitted signals either in the form of the echo signals themselves or in the form of signals which are generated as an incident to receipt of an echo. In addition the system includes a delay means for applying a second signal to each of the detection elements, the second signal being applied to each of the detection elements for a given time period with the time of beginning of application of the second signal being different in the case of each of said detection elements.

The detecting elements may have several forms; there are a number of structures which will provide an output signal in response to the simultaneous application of two input signals. These structures include mixers and detectors and AND gates. To make this clear, two embodiments of the invention are shown. In both embodiments the presence of an echo is originally detected by comparing echoes with a sample of the transmitted signal. In one embodiment this is done in a series of detectors, the sample of transmitted signal being applied to each detector at a different time whereby output from a given detector is indicative not only of receipt of an echo but is indicative of the distance from which that echo was returned. In the other embodiment the presence of echoes is first determined without regard to the distance from which they were returned. In a subsequent step, a signal developed from the echo is applied to a plurality of detectors which are provided with locally injected signals at different times whereby range to the target is indicated by identifying which of the detectors provides an output.

A feature of the invention which can be applied to both of these embodiments is the provision of means for diminishing the response of the system to echo signals which are received shortly after the transmission of the radar search signal. This diminution in signal level can be accomplished in a variety of ways that provide initial gain control. Advantageously, it is accomplished by limiting the amplitude of the echo signal when first received.

Figure 1:
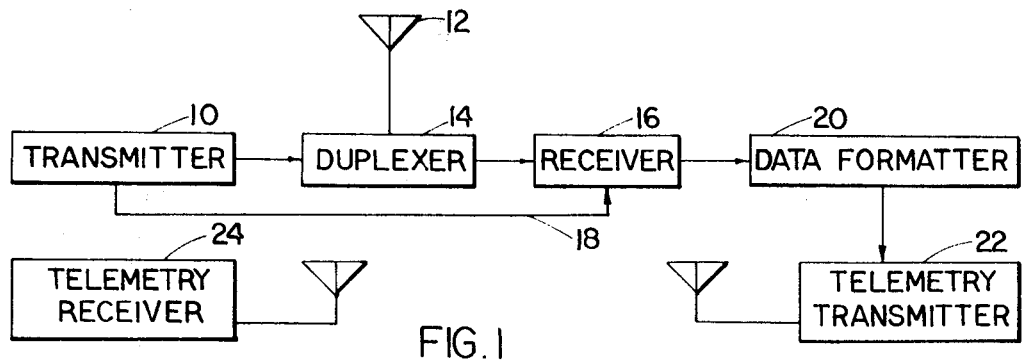
FIG. 1 is a generalized block diagram of a "MISS-DISTANCE" indicator system.

Referring to FIG. 1 of the drawing, the system thereshown comprises a transmitter 10 of radio frequency signals which are applied to a signal radiating and receiving antenna 12 through a duplexer 14. Echo signals impinging upon the antenna 12 are applied through the duplexer to a receiver 16 which employs signals derived from the transmitter in its operation. Tat signals from the transmitter are applied to the receiver is represented by the connection line 18. The function of the duplexer 14 is to protect the receiver input circuitry from being overloaded by transmitter output and to prevent returning echo signals from being dissipated in the transmitter circuitry.

The system represented in FIG. 1 is suitable for "miss-distance" indication. The transmitter, duplexer, receiver, and the antenna are mounted upon a moving target, such for example as a drone aircraft, and the function of the system is to indicate by what distance missiles and bullets fired at the target miss it and pass by. Returning echoes are detected in the receiver to provide an output which is supplied to a data formatter 20, the function of which is to reduce the data to a form suitable for telemetering by a telemetry transmitter 22 to a ground station represented by telemetry receiver 24.

Figure 2:
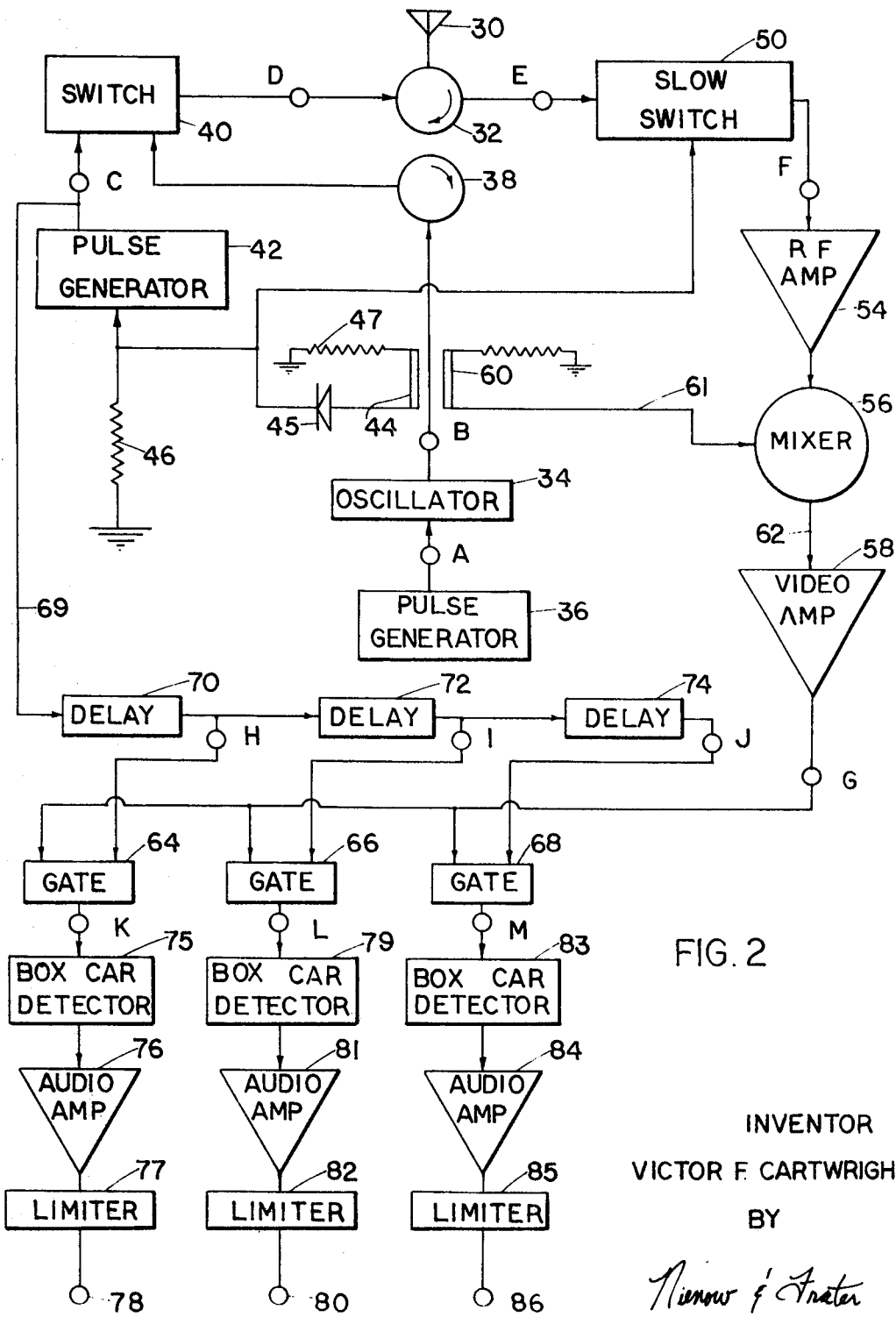
FIG. 2 is a block diagram of a ranging system embodying the invention.

Utility of the invention is not limited to this application. However, since it provides a ranging transmitter and receiver which are especially advantageous for this purpose, the embodiments selected for illustration in the drawing are tailored to miss-distance indication. The embodiment illustrated in FIG. 2 employs range gates in the video section of the receiver. It is particularly useful in those applications where the presence or absence of a radar target is to be determined in each of many increments of range. Thus, it is particularly useful in applications where a large number of range gates are to be employed. However, to avoid undue complication of the drawing and description only three gates are shown in the embodiment of FIG. 2. The embodiment of FIG. 5 employs gates or detectors in the radio frequency section of the receiver. This arrangement has advantages when determination of the presence or absence of a target is required to be made in fewer increments of range.

In the embodiment of FIG. 2 the antenna 30 serves as the radiator for transmitting the radar signal and it serves also as the receiving antenna for echoes of those signals. It is able to serve this dual purpose because of the use of a duplexer 32 to which the antenna is connected. Advantageously, the duplexer comprises a circulator such, for example, as a ferrite circulator. The radio frequency signal is generated in a signal generator represented by the oscillator 34 which in this embodiment is turned on and off by a pulse generator 36. Oscillator output is applied through a ferrite circulator 38 to a switch 40. The circulator serves only as an isolating unit to insure that oscillator performance is uneffected by switch operation. When the switch 40 is closed the output of oscillator 34 is applied through the duplexer 32 to the antenna 30. Means are provided for actuating switch 40 only after the oscillator 34 has been rendered operative by pulse generator 36. In this embodiment that means comprises the use of a switch 40 which responds to a pulse so that the switch is opened only so long as the pulse signal is present. This pulse, called an "enabling" pulse, is provided by pulse generator 42 in response to a signal applied to it when the signal generator or oscillator 34 is operative. Some of the energy in this signal generated in the oscillator 34 is removed by coupling device 44 which is in series with a rectifier 45 and a pair of resistors 46 and 47. Some of that energy is rectified by the rectifier 45 and a voltage is developed across resistor 46 which turns on pulse generator 42 and initiates generation of the enabling pulse that is applied through line C to the switch 40.

Figure 3:
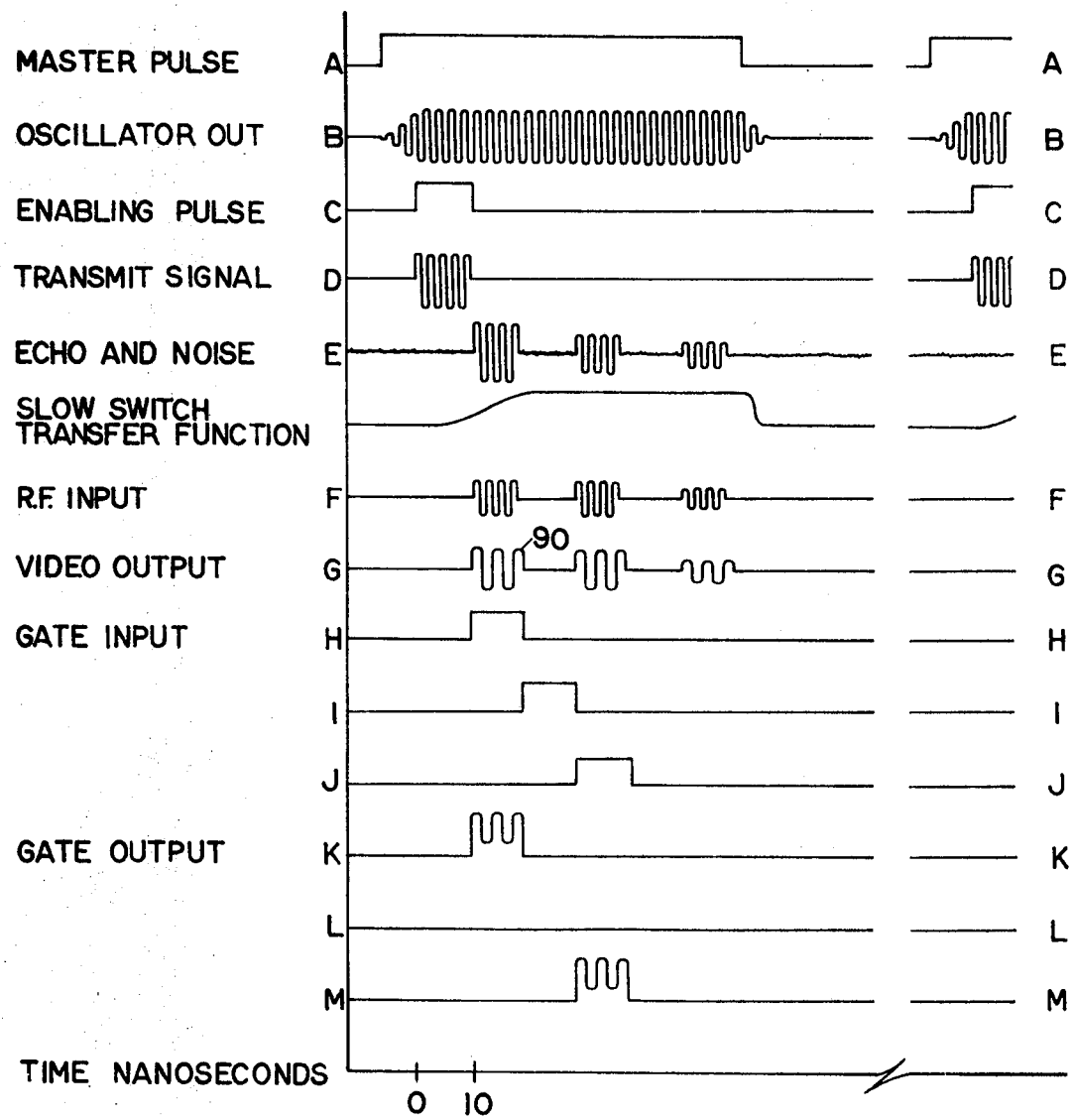
FIG. 3 is a graph showing the character and time relation of the signals at several points within the system of FIG. 2.

Operation of the transmitter section of the system of FIG. 2 is understood by reference to FIG. 3 which shows how the signal at various points on the transmitter varies with time. The output of the pulse generator 36 is called the "master" pulse and it is applied by line A to the signal generator or oscillator 34. The signal on line A is shown in the top line in FIG. 3 to comprise a relatively long pulse which begins a short time before zero time. The signal generator or oscillator 34 is operative for the duration of the master pulse as shown in the second line from the top in FIG. 3. This is the oscillator output signal on line B. Some of the energy in the oscillator output is coupled from line B through the coupler 44 and is rectified to develop a voltage across resistor 46 which turns on the enabling pulse generator 42. The enabling pulse has duration substantially less than the master pulse and it is applied by line C to the switch 40. For the period of the enabling pulse, switch 40 is biased to permit the passage of energy from the oscillator 34 through the switch 40 and by line D to the antenna 30. The enabling pulse on line C and the radar signals supplied at line D to the antenna are illustrated on levels C and D, respectively, of FIG. 3. The time of beginning of the enabling pulse is considered to be zero time in the graph of FIG. 3.

In a miss-distance indicator which is to be lightweight and small and which is to indicate the presence of radar targets at ranges measured in feet, the operating frequency will ordinarily be relatively high. In the embodiment of FIG. 2 it is assumed that the signal generator or oscillator 34 operates in the microwave region at a frequency near 1,800 MHz. Some of the active oscillator elements that are operative in the microwave range do not turn on and off with a high degree of reliability and it is partly for this reason that two pulse generators are employed. One generator can initiate oscillation and the other, being dependent for its operation upon proper oscillator operation, is used to connect the oscillator output to the antenna only after the oscillator is fully operative.

Electromagnetic energy travels approximately one foot through air or space in 1 nanosecond. The first wave in a train of waves emanating from the radiators 30 will travel to a target 5 feet distant and be reflected back through that same distance to the antenna 30 in about 10 nanoseconds. The system of FIG. 2 is arranged to determine the presence or absence of targets in successive 5-foot increments of range from the antenna 30. For this purpose the enabling pulse is made to have a 10-second duration as shown on line C of FIG. 3 whereby the transmitted radar signal has a ten nanosecond duration as shown in line D of FIG. 3. If an echo of that transmitted signal is returned to antenna 30 the signal that it induces in the antenna will be directed by duplexer 32 to line E through an apparatus 50 called a "slow switch," then by line F to a radio frequency amplifier 54 and thereafter to a mixer 56. The mixer will furnish an output to the video amplifier 58 in response to receipt of two input signals. The output of the radio frequency amplifier comprises one of those signals. The other signal is furnished by the signal generator or oscillator 34. Some of the output of the oscillator is coupled by a coupling unit 60 to the mixer by a line 61. If the two input signals to the mixer occur simultaneously, and if they have some frequency difference, then an output will appear at the output line 62 of the mixer for application to the video amplifier. The signal applied from the oscillator by line 61 will differ in frequency from the frequency of the echo signal provided that the echo was reflected from a moving target so that it includes a doppler component. Since the two input signals to the mixer must occur simultaneously the mixer can provide an output only for those echoes which return prior to the time when the oscillator is turned off at the end of the master pulse. Thus the duration of the master pulse determines the maximum range of the system.

The mixer and video amplifier are not capable of determining at what time during the master pulse the echo was returned. However, the output of the video amplifier which appears on line G will include a signal only at the time that an echo is being returned to the antenna. Distance to the radar target can be computed by determining the time elapsed between signal transmission and echo return. It can be determined because, as previously explained, the velocity of electromagnetic signals is known. The doppler output signal on line G is applied simultaneously to gates 64, 66, and 68. These are AND gates through which the doppler signal on line G will pass providing that an enabling signal is applied to a gate simultaneously with application to it of the doppler signal on line G. Such an enabling signal is generated in pulse generator 42 and is available on line C from whence it is directed by a line 69 to a delay element 70. In this embodiment, for the sake of simplicity, the delay element is arranged to provide a 10-nanosecond delay. After passing the delay element 70, the enabling signal is applied by line H to the gate 64. It is also applied to a second delay element 72 which is assumed to provide a 10-nanosecond delay before application of the signal to a third delay element 74 and the simultaneous application of the signal to line 1 which leads to gate 66. Having traversed the delay element 74, the enabling signal is applied by line J to the gate 68. The character of the enabling signal applied to gates 64, 66 and 68 and the fact that the delay signal is supplied to them in sequence is illustrated in FIG. 3 at lines H, I and J. Having in mind the time scale of the bottom line of FIG. 3, the enabling pulse supplied to switch 40 results in transmission of a radar signal in a ten nanosecond long burst. Coincident with the end of that burst, and after a 10-nanosecond delay, an enabling signal is applied by line H to gate 64. Simultaneously with the ending of that enabling signal, an enabling signal of 10-nanosecond duration is applied by line I to gate 66. When that signal ends, a signal of 10-nanosecond duration arrives at gate 68 via line J. Any doppler signals that appeared at a gate at the time when the enabling signal was applied to that gate will pass through the gate to the respectively associated one of output lines K, L and M, for application to a "boxcar" detector of doppler signals. The output of the detector is applied to an audio amplifier and is then subjected to the action of a limiter before being applied to an output terminal for connection to the data formatter. In particular the output of gate 64 is applied by line K to a boxcar detector 75 whose output is applied to an audio amplifier 76 and then to a limiter 77 before a signal appears at the output terminal 78. Output line L from gate 66 directs doppler signals that pass through that gate to a boxcar detector 79 whose output is applied to a terminal 80 through the series combination of audio amplifier 81 and limiter 82. The output of gate 68 appears on line M for application to boxcar detector 83 and audio amplifier 84 and limiter 85 and finally to output terminal 86.

The graph of FIG. 3 shows that an output appears on line K and an output appears on line M. To account for these output signals it has been assumed that certain echoes were received as a result of transmission of the signal shown on line D. Referring to level E of FIG. 3 it has been assumed that an echo of 10-nanosecond duration was received at antenna 30 beginning at a time immediately after the radar output signal was transmitted. No echo is received in the 10-nanosecond interval following termination of the first echo. At that time a second echo of 10-nanosecond duration was received. That is followed by a 10-nanosecond period of silence after which a third echo of 10-nanosecond duration is received. Each echo has an amplitude less than that which preceded it to illustrate that the amount of energy that is returned from distant targets is less than the energy returned from targets that are disposed at short range.

Neglecting the difference in amplitude for the moment, receipt of the echoes results in an input to the radio frequency amplifier 54 of a kind shown at level F in FIG. 3. Thus the slow switch has an effect upon amplitude but not on frequency or timing. The three RF input signals or echoes at line F are applied to mixer 56 during the period of master pulse A. Thus the echo signals at line F are applied to the mixer simultaneously with the oscillator output. The result is that a signal appears at line 62 at the output of the mixer which represents the doppler component of the echo signal if indeed there is a doppler component. It is assumed that the target is moving and that there is a doppler output signal. These doppler signals appear at line G as shown at level G in FIG. 3. Transit time through the receiver being considered negligible for the purpose of this discussion, the video output signals at line G occur simultaneously with the receipt of an echo signal at antenna 30. The doppler signal is applied by line G to the three gates 64, 66 and 68. The signal designated 90 corresponds to the first received echo. It is applied to the three gates at the same time that an enabling signal is applied by line H to gate 64. The result is that the doppler signal is permitted pass through the gate to the boxcar detector 75 by line K as shown at level K of FIG. 3. No echo is received in the 10-nanosecond period following receipt of the first echo. Accordingly, although an oscillator signal is still applied to the mixer 56, there is no output signal from the mixer and no doppler signal is applied to the gates in this time period. Accordingly, even though an enabling signal is applied by line I to gate 66, no signal passes through the gate and no signal appears on line L. Thus, no signal appears at level L of FIG. 3. In the next 10-nanosecond period an echo is received and it results in the application of a doppler signal to line G and to the gates at the time when an enabling pulse is applied to gate 68 by line J. The result is that the doppler signal is permitted to pass through the gate 68 to output line M as shown in FIG. 3.

For the purpose of this explanation it has been assumed that there are no additional gates despite the fact that the master pulse continues on. Consequently, the receipt of the third echo, while it results in a doppler output signal on line G, results in no range signal output at any of the output terminals 78, 80 and 82 because that doppler signal is not applied to any of the gates simultaneously with an enabling pulse. The appearance of a doppler signal on line K indicates that there was a target in the first range increment from the antenna. The appearance of no doppler signal at line L indicates there was no target in the next range increment from the antenna. Finally, an out signal at line M indicates that there was a radar target in the third range increment.

Figure 4:
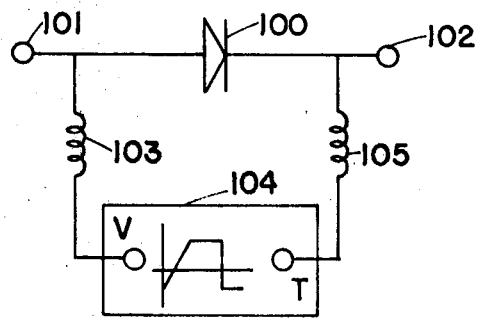
FIG. 4 is a schematic diagram of one form of a "slow switch" employed in the system of FIG. 2.

The amplitude of an electromagnetic radiation at any point distant from the radiator is determined by the inverse of the square of the distance from the radiator to the point of measurement. Accordingly, the amplitude of echoes returning from nearby targets may be many times greater than the amplitude of echoes returning from distant targets. A receiver having sufficient sensitivity to respond to the weak echo might be overloaded by the echo from a nearby target. To overcome this problem means are advantageously provided in the invention for limiting the amplitude of echoes of nearby targets. This may be done by diminishing the amplitude of the echo signal prior to application to the receiver. This arrangement is preferred and has been selected for illustration in the drawings. The slow switch 50 is a device which becomes increasingly more conductive with time following an initial signal rendering it conductive. There are a variety of switches of this kind. A preferred form uses solid state devices, usually some combination of diodes and a means for altering a bias voltage impressed across the diode so that the diode is first rendered only party conductive and subsequently is rendered more conductive. An element form of such a switch is illustrated in FIG. 4. It includes a diode 100 connected in series between a pair of terminals 101 and 102. A bias circuit connected in parallel with the diode includes, in series, a radio frequency choke 103, a source 104 of bias voltage which varies with time as a square wave pulse having a slow rise time, and finally it includes another frequency choke 105. Returning to FIG. 2, the voltage develop across resistor 46, being derived from the oscillator 34 output which is controlled by the master pulse, is a pulse having substantially the duration of the master pulse except that it has a relatively long rise time. The combination of that voltage and slow switch 50 results in a transfer characteristic across the switch which varies with time as shown at the SLOW SWITCH TRANSFER FUNCTION level in FIG. 3. The effect of that transfer function is to diminish the amplitude of early echoes before their application to the radio frequency amplifier of the receiver. This is shown in line F of FIG. 3 where the amplitude of the first two radio frequency signals is approximately the same despite the fact that the amplitude of the first echo was substantially greater than the amplitude of the second echo. No attempt is made to reduce the amplitude of all of the echoes to the amplitude of the echoes received from the greatest range and the last echoes to be received may have lesser amplitude, at the point of application to the receiver, than do earlier echoes.

Figure 5:
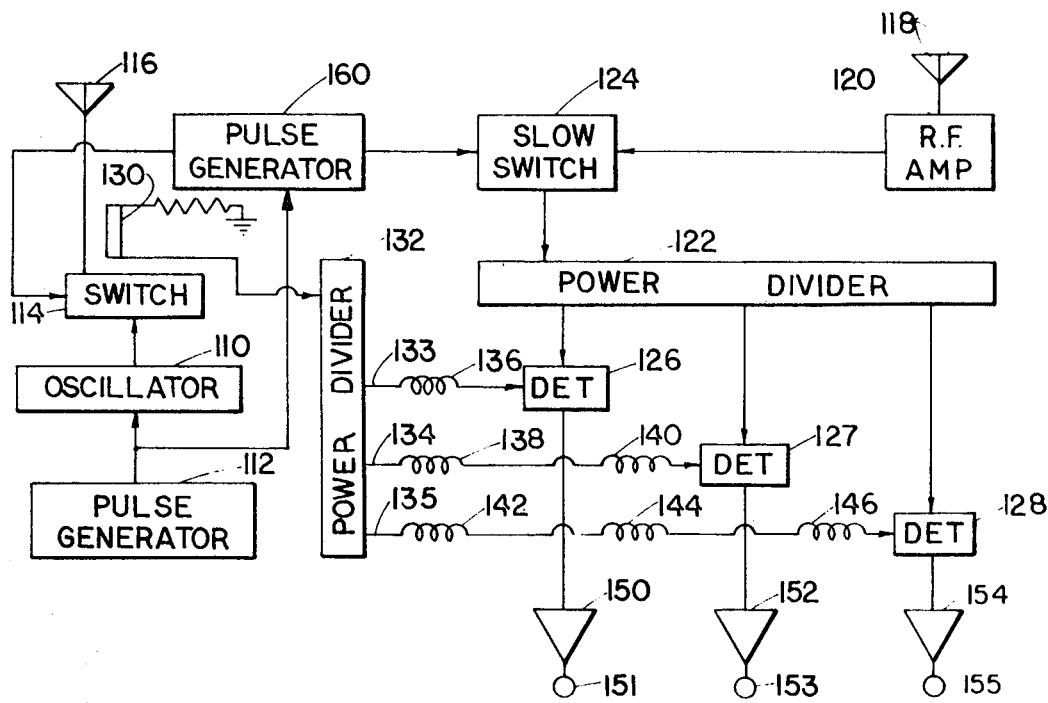
FIG. 5 is a block diagram of an alternative form of ranging system embodying the invention.

The embodiment of FIG. 5 employs a separate detector, sometimes called a radio frequency gate, for each increment of range in which measurement is to be made. This embodiment employs separate antennas for transmitting and receiving. It could as well use the duplexer or circulator arrangement of FIGS. 1 and 2. Radar signals are generated in a signal generator or oscillator 110 during the period that a pulse is supplied by the pulse generator 112. Pulse generator 112 provides a master pulse similar to the master pulse provided by pulse generator 36 of the embodiment of FIG. 2. Oscillator output is applied to a switch 114. As in the case of the other embodiment, that switch permits oscillator output energy to reach the antenna for a short period of time corresponding to some selected fraction of the range of the system. That energy is radiated by the antenna 116 and echoes of that energy are received by the receiving antenna 118. The signal is first amplified in a radio frequency amplifier 120 and then is applied to a power divider 122. While not essential, in the preferred form of the invention the signal is applied to the power divider through a slow switch 124 as shown. The power divider divides the incoming signal and applies portions of the power in that signal simultaneously to each of the three detectors 126, 127 and 128. Some of the energy supplied to the antenna 116 is coupled through a coupler 130 to a power divider 132 which divides that signal for application to three lines 133, 134 and 135 which are connected to the three detectors 126, 127 and 128, respectively. The signal applied to line 133 is delayed in its application to detector 126 by a delay element 136. Twice as much delay is introduced in the application of that local signal by line 134 to detector 127. Thus two delay elements, 138 and 140, are included in that line. Three delay elements 142, 144 and 146 are included in line 135 to detector 128. While the operation of this system is somewhat different than that of the system shown in FIG. 2, its operation can be understood by analogy with that of FIG. 2 and by examination of FIG. 3. Let it be assumed that the switch 114 is turned on for a period of 10 nanoseconds and that each of the delay elements 136, 138, 140, 142, 144 and 146 introduces a time delay of 10 nanoseconds. In that circumstance the local signal will be applied to detector 126 by line 133 through delay unit 136 for a time beginning at the cessation of the transmitted signal and lasting for 10 nanoseconds. The local signal applied to detector 127 begins 10 nanoseconds after cessation of the transmitted signal and ends 10 nanoseconds later. The local signal applied to detector 128 is applied during the 10-nanosecond period between 20 and 30 nanoseconds following cessation of the transmitted signal. If an echo containing a doppler component is received at antenna 118 within the first 10-nanosecond period following succession of the transmitted signal, it will indicate that there has been reflection from a moving radar target at a corresponding distance from the two antennas. That echo signal will be applied to detector 126 through the slow switch 124 and power divider 122. Simultaneous application of that signal with the local signal to detector 126 results in a doppler output signal being applied to amplifier 150 and output terminal 151. Since the local signal is a sample of the transmitted signal and has the same frequency as the transmitted signal there will be no output from detector 126 unless the frequency of one of those two input signals has been changed. One way that can be changed is to have the echo reflected from a moving target so that the echo includes a doppler component and it is this doppler component that will appear at the output terminal 151. If the echo is returned from a point in the corresponding range increment it will be applied to detector 127 at a time simultaneous with the application to that detector of a local signal through line 134. If the echo was returned from a moving target so that echo signal includes a doppler component then that doppler signal will be applied to an amplifier 152 and will appear at output terminal 153. A doppler signal will be delivered by detector 128 to amplifier 154 and output terminal 155 when the signal is returned as an echo from a moving target within the corresponding distance from the antenna because such an echo will be applied to detector 128 simultaneously with the application to that detector of a local signal through line 135. Early returning echoes are diminished in amplitude by the slow switch 124. The switch is initiated by pulse generator 160 which is the same pulse generator that applies the enabling pulse to the switch 114.

Pulse oscillator 112 serves a somewhat different purpose in the embodiment of FIG. 5 than does the pulse generator 36 of FIG. 2. Both of them arrange to turn the oscillator on prior to the time for application of a radar signal to the transmitting antenna and they turn off the oscillator after the transmission switch is open. This insures that the transmitted signal has uniform amplitude over each cycle of its transmission. In FIG. 5 it serves also to activate the enabling pulse generator 160. In FIG. 2 the pulse generator 36, furnishes a longer pulse so that the signal generator 34 will provide an output signal for use as the local signal in mixer 56 to determine the maximum range at which signals could be detected if a proper number of video gates were provided. It will be apparent that the several gate circuits can be made to respond to echoes over different increments of range by adjusting the period over which the local signal is applied to the gate or detector and by altering the period over which the search signal is transmitted. It will be apparent to those skilled in the art that adjustment in these variables can result in some gates being responsive to echoes within range increments of different magnitude and that the system can be made nonresponsive to echoes within particular increments of range. Moreover, certain gates may be made to respond simultaneous to echoes within certain increments of range whereby the simultaneous occurrence of an output from two gates is indicative of the presence of a target at a range different than that indicated when only one of the two gates provides an output. The systems shown are so arranged. While neglected in the discussion above for the sake of clarity, those familiar with this art will recognize that the two signals applied to gate or detector need not be coincident for the total period of both. Coincidence for any significant period will provide a measurable output signal.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. A range detection system comprising in combination:
means for transmitting signals for a period corresponding to the time required for transmitted signals to traverse a selected fraction of the range of said system;
detecting means for detecting said signals as echoes after reflection from a distant target comprising a plurality of means for providing output signals each operative to provide an output signal upon the simultaneous application to it of two input signals;
means for applying signals derived from the echoes of said signals to said plurality of means simultaneously as a first one of said two input signals; and
delay means for applying to each of said detection means a second one of said two input signals in the form of a signal having predetermined duration, the time of beginning of application of said second signal to each of said plurality of means being different in the case of each of them;
said means for applying signals derived from said echoes to said detecting means being effective to limit the amplitude of signals derived from earlier received echoes in greater degree than the signals derived from later received echoes,
said means for applying to each of said detectors a second one of said input signals being effective to apply said second one of said input signals for a duration substantially equal to said period.

2. The invention defined in claim 1, in which said transmitted signal and said second signal alternate at the same frequency, and in which said detection means includes means responsive to said two input signals to provide an output signal variable with doppler shift between said first and second signals.

3. The invention defined in claim 2, in which said second signal is derived from the source of said transmitted signal.

4. The invention defined in claim 3, in which said means for transmitting signals is effective to transmit a series of such signals repetitively at intervals exceeding the period between transmission of a given signal and the end of the last to begin of the second signal derived from said given signal.

5. The invention defined in claim 4 which further comprises an antenna for received reflected signals, and in which said means for limiting the amplitude of signals derived from echoes comprises means interposed in the path from said antennas to said detection means for attenuating signals conducted along said path in a degree which diminishes in time beginning at the beginning of said period.

6. The invention defined in claim 5, in which said means for attenuating signals comprises a switch which is rendered more conductive with time.

7. A range detection system comprising in combination:
means for generating signals and for transmitting them for a period corresponding to the time required for transmitted signals to traverse a selected fraction of the range of said system;
detecting means for detecting said signals as echoes after reflection from a distant moving target comprising a detector operative to provide a doppler output signal upon the simultaneous application to it of two input signals differing in frequency by the amount of a doppler component in one of them;
means for applying said generated signals and the echoes of said transmitted signals to said detector as said two input signals;
a plurality of gates effective to provide an output signal as an incident to the simultaneous application thereto of two gate input signals;
means for applying said doppler signals to said gates simultaneously as one of said gate input signals;
delay means for applying to each of said gates a second gate signal having duration substantially equal to said period, the time of beginning of application of each of said second gate signals to said gates being different in the case of each gate; and
said means for generating signals and for transmitting them comprising a signal generator; and means for initiating operation of the signal generator and thereafter, at a time corresponding to twice the transit time to the end of said range, terminating operation of said signal generator; and a signal radiator; and means for applying signal output of said signal generator to said radiator for said period.

8. The invention defined in claim 7, which further comprises means for detecting the doppler signal at the output of each of said gates.

9. The invention defined in claim 7, in which said means for applying signal output of the signal generator to said radiator comprises a switch responsive to an enabling pulse and a generator of an enabling pulse which endures for said period.

10. The invention defined in claim 9, in which said second gate signal is derived from said generator of the enabling pulse.

11. The invention defined in claim 10, which further comprises means for diminishing doppler signal output such that doppler signals provided as an incident to earlier received echoes are diminished in greater relative degree than are doppler signals provided as an incident to later received signals.